United States Patent [19]

Dabrowski

[11] 4,277,456

[45] Jul. 7, 1981

[54] MINERAL SUBSTANCE BASED ON A REVERSIBLY SWELLABLE TRI-LAMINAR MINERAL DEVELOPED TO BE CRYSTALLINE OVER A LARGE AREA AND HAVING CRYSTAL LAYERS SEPARATED FROM ONE ANOTHER

[75] Inventor: Ralf Dabrowski, Hilden, Fed. Rep. of Germany

[73] Assignee: Firma Hans Kramer GmbH & Co. KG, Fed. Rep. of Germany

[21] Appl. No.: 925,780

[22] Filed: Jul. 18, 1978

[51] Int. Cl.$^3$ .................. B32B 19/00; C01B 33/22
[52] U.S. Cl. ........................ 423/328; 241/21; 428/402; 428/409; 428/363; 252/378 R
[58] Field of Search ............... 428/363, 402, 357, 338, 428/409; 241/21; 423/328; 252/378 R

[56] References Cited

U.S. PATENT DOCUMENTS

| | | | |
|---|---|---|---|
| 2,405,576 | 8/1946 | Heyman | 428/363 |
| 2,810,425 | 10/1957 | Heyman | 427/387 |
| 2,865,426 | 12/1958 | Heyman | 428/363 |
| 3,325,340 | 6/1967 | Walker | 428/363 |
| 3,618,753 | 11/1971 | Glasspoole | 428/363 |

FOREIGN PATENT DOCUMENTS

| | | | |
|---|---|---|---|
| 693821 | 9/1964 | Canada | 428/363 |
| 793267 | 4/1958 | United Kingdom | 428/363 |

*Primary Examiner*—Ellis P. Robinson
*Attorney, Agent, or Firm*—Scully, Scott, Murphy & Presser

[57] ABSTRACT

A fine-grain crystalline mineral selected from the group consisting of vermiculite and hydro-mica is contacted with water to swell the fine grain mineral and the swollen mineral is thereafter comminuted under conditions preserving its crystalline structure to provide a reversibly swellable tri-laminar mineral which is crystalline over a large area and in which the crystal layers or laminations are separated from one another.

14 Claims, No Drawings

MINERAL SUBSTANCE BASED ON A REVERSIBLY SWELLABLE TRI-LAMINAR MINERAL DEVELOPED TO BE CRYSTALLINE OVER A LARGE AREA AND HAVING CRYSTAL LAYERS SEPARATED FROM ONE ANOTHER

Vermiculite belongs to the mica-type clay minerals, which have a swellable crystal lattice and of which the crystals are of lamerllar formation. It is closely related to the group of the montmorillonite-saponite minerals. The mineral belongs to the tri-laminar silicates and has water intercalated between the so-called sets of laminations. Because the sets of laminations are not rigidly bonded to one another, vermiculite possesses an intracrystalline swelling power. Connected therewith is the ability of vermiculate crystals to expand to about 30 times their original thickness in one direction on being quickly heated. For gaining knowledge of the structure and the properties of vermiculite, reference is made to the following literature:

According to Römpp's Chemie-Lexikon, Frankh'sche Verlagshandlung, Stuttgart, 7th Edition, heading 3000, vermiculite in the ideal case presents an approximate composition of the following formula: $Mg_3(Al,Si)_4O_{10}(OH)_2(H_2O)_4$. In addition, vermiculite contains considerable quantities of combined iron (Fe).

This property of expansion is also shown by "hydromicas" and "mixed-layer minerals." What is to be understood by the last-mentioned minerals are those in which, for example, vermiculite laminations and mica laminations crystallise in alternating random sequence.

The definition of the mineral starting substance, vermiculite, is given by Hugo Strunz, Mineralogical Tables, 5th Edition, Leipzig 1970, Akademische Verlagsgesellschaft, Geest & Portig KG., page 447.

The definition of the mineral starting substance, hydromica, is given by Salmang-Scholze in "The physical and chemical principles of ceramics," Springer Verlag, New York, 1968.

These minerals are used in order to produce the mineral substance according to the invention, which is based on a reversibly swellable tri-laminar mineral developed to be crystalline over a large area. These clay minerals, on their part, do not have the properties of the mineral substance of the invention, namely, the new structure which leads to strong adhesion and cohesion forces and also to a certain shrinkage behaviour on being dried from a dispersion or the moistened or wetted dry mass.

This new structure of the mineral substance according to the invention represents a novel statement of object.

This is produced from the tabular particles with extremely thin, uniformly planar particles with a thickness from 0.5 to 10 microns and with an equivalent diameter from 10 to 200 microns and a ratio between particle thickness and equivalent diameter equal to or smaller than 1:10, of which the particles present hydrophilic properties on the planar or smooth particles, which quickly take up or give off polar liquids, such as water. The mineral substance according to the invention is only established by a conversion process from these starting minerals.

A mineral substance has now been found which is based on a reversibly swellable tri-laminar mineral developed to be crystalline over a large area and with crystal layers or laminations separated from one another.

The invention is defined in the claims. In addition, the mineral substance according to the invention has been filed at the German Patent Office. The said substance has thus been additionally disclosed. Various processes for the production of the mineral substance according to the invention may be given. One preferred process consists in that the starting mineral is swelled with water and is transformed, by a mechanical comminution which preserves the structure, into extremely thin, uniformly planar tubular particles of certain defined dimensions.

The mineral substance according to the invention offers considerable advantages for technological purposes, because of its inorganic composition and because the said substance is incombustible.

Certain parameters are provided by the following measurements:

1. Measurements of the plasticity:
    1.1: As regards procedure, reference is made to the following literature:
        1.11 DKG guiding principles, X/1969; definition, enclosure 2, evaluation according to Pfefferkorn.
        1.12 "Ceramics," Salmang/Scholze, enclosure 3; pages 226-7: Principles of the rheology (5.2.1) pages 236/7: Methods of Pfefferkorn and of Bowmaker.
    1.2: Diagram 1.
        Plasticity measurements, curves according to Pfefferkorn and according to Bowmaker.
        (1) The curves relate to:
            (1) the substance according to the invention in aqueous dispersion,
            (2) finely ground vermiculite as basic substance, in a grain size distribution corresponding to substance (1) in aqueous dispersion,
            (3) lean clay,
            (4) fat clay.

The curves according to Bowmaker are compared for the purpose of evaluating the results of these measurements.

A broad range of practically constant plasticity exists if the Bowmaker curve has a shallow path.

The range becomes narrower in proportion as each curve falls off more steeply.

Consequently, the steepness of the curve is a standard as regards the plasticity; what is to be understood by "steepness" is the ratio between the difference of the Bowmaker values and the difference of the water values $\times 1000$.

Clays (3,4) provide a low plasticity range. In aqueous dispersion, vermiculite (2) only shows a certain plasticity range with a very high demand for water. This large proportion of water leads to "bleeding" from the plastic mass.

The substance according to the invention (1) confirms a very broad plasticity range. The water content is substantially smaller and the system is stable against bleeding or exudation and sedimentation.

For the substance according to the invention (1), the Bowmaker curve runs asymptotically with increasing water content.

For the substance according to the invention (1), and in the concentration range from 110 to 140 g $H_2O$/100 g of dry substance, the Bowmaker value is only changed from 8 to 6, corresponding to a steepness of 6.7.

The value for the basic substance, vermiculite (2), in the same concentration range, shows a change in the Bowmaker value from 21.5 to 9, corresponding to a steepness of 417.

The parameters of the plasticity are therefore very different for the starting substance and for the new substance according to the invention (1) which is produced therefrom.

This difference is even greater by comparison with the typical clays taken into account with these measurements.

2. Measurements of the rheological properties

Curves of the rheological properties in aqueous dispersion at 20° C. (Diagram 2).

Method of measurement: rotary viscosimeter "Rheomat-15"/Contraves.

The curves in respect of the substance according to the invention are compared with those of the basic substance, vermiculite.

Even with a low concentration of solids, the substance according to the invention shows a high quasi-plastic capacity (see Salmang-Scholze, page 227).

This is the reason why the substance according to the invention only sediments slowly—even with a low concentration of solids and by contrast with the basic substance, vermiculite.

As an aqueous dispersion with a solid content of 20%, the substance according to the invention shows a very steep curve of the shearing stress beyond the shearing speed D. Already when $D=0$ sec$^{-1}$, a shearing stress of $\tau=300$ dyn/cm$^2$ is produced.

When $D=115$ sec$^{-1}$, the shearing stress reaches the value of $\tau=1000$ dyn/cm$^2$.

The considerable value of $\tau=300$ dyn/cm$^2$ at the shearing stress $D=0$ enables the quasi-plastic properties of the substance according to the invention to be clearly recognised.

The basic substance, vermiculite, does not present these properties in aqueous dispersion.

With the same solid content of 20%, the function of $\tau$ over D has a substantially more shallow curve.

When $D=0$, $\tau$ is likewise equal to 0. It thus becomes clear that there is no quasi-plastic behaviour.

The starting substance does not show any quasi-plastic behaviour. It is only when $D=700$ sec$^{-1}$ that there is a shearing stress of $D=100$ dyn/cm$^2$.

The surprising rheological properties of the new substance according to the invention are the reason why this substance, in the form of a paste and also in a flowable form, is capable of being spread or sprayed to provide thin, uniform films. These possibilities are very surprising in respect of an inorganic substance and are not obvious.

3. Measurements of the wear resistance and adhesion strength 3.1 Procedure for the measurements.

The substance to be investigated is applied from aqueous suspension on to a smooth support, such as bright steel or window glass, and thereafter dried at 110° C.

In the dried state, the thickness of the layer or coating is 100 microns ±10%.

A cylindrical soft rubber element with the base area of 154 mm$^2$, corresponding to the diameter of 14 mm., is positioned on this coating.

The rubber element is fixed to a metal rod. This is so guided that there is a slight degree of mobility in the perpendicular direction.

The total load operating on the coating of substance to be tested amounts to 200 p., corresponding to a pressure of 130 p/cm$^2$.

The plate with the coating is shifted backwards and forwards transversely of this load, always by 50 mm. in one second. Any possible change in the surface is ascertained after each displacement.

| Measurement conditions: | |
|---|---|
| Bearing pressure: | 130 p/cm$^2$ |
| Bearing area: | soft rubber with 154 mm$^2$ |
| Rubbing speed: | 50 mm/sec. |
| Coating thickness: | 100 microns ± 10% |
| Support: | bright steel sheet |

TABLE 1

3.2 Results

| Substance investigated | No. of rubbing movements | Measurement result |
|---|---|---|
| Substance according to the invention | 100* | No discoloration, No wear, good adhesion |
| Vermiculite | 1 | Discoloration, |
|  | 16 | coating completely worn away, defective adhesion |
| Talcum | 1 | Discoloration, coating completely worn away, defective adhesion |
| Fat clay | 1 | Discoloration, |
|  | 29 | coating completely worn away, defective adhesion |
| Lean clay | 0 | the film already lifts from the support with the drying, no adhesion. |

*The comparision test was stopped after 100 rubbing movements. Up to this time, no change on the surface and no decrease in weight were detected.

After 100 rubbing movements, the substance according to the invention does not show any discoloration or any visible or weighable signs of wear.

On the other hand, vermiculite, as basic substance and with the same grain size composition, shows a strong discoloration and also a change in the surface after one rubbing movement. After 16 rubbing movements, the applied coating is already completely worn away.

The substance according to the invention thus differs as regards the wear resistance from the starting substance used for its manufacture and from other comparison substances used industrially by virtue of an unexpected lack of discoloration and also of the wear resistance found in practice and the good adhesion to the support.

TABLE 2

3.3 Results

Measurement conditions: as with Table 1
Support: Window glass

| Substance investigated | No. of rubbing movements | Measurement result |
|---|---|---|
| Substance according to the invention | 100* | No discoloration, no wear, good adhesion |
| Vermiculite | 1 | Discoloration, |
|  | 19 | Coating completely worn away, defective adhesion |

*The comparison test was stopped after 100 rubbing movements. Up to this time, no change on the surface and no decrease in weight were detected.

The substance according to the invention, after 100 rubbing movements, shows the same, unaffected adhesion to the two chosen supports, namely, to the bright steel and to the clear glass. On the other hand, the starting substance for the production of the new substance according to the invention, with the same composition as regards grain sizes, after 19 rubbing movements on glass and with 16 rubbing movements on steel, already shows a lack of adhesion, due to sliding away from the support.

The difference in the resistance to wear is considerable. The new substance according to the invention shows practically no wear. On the other hand, the coating or layer of vermiculite is completely worn away after these rubbing movements.

It is surprising that the new substance according to the invention, as regards this parameter, presents entirely different properties from those of the starting substance, vermiculite.

Supplementary measurements concerning adhesion strength and wear resistance 3.4 Procedure for the measurements
For carrying out these measurements, there is used the same procedure (see 3.1) as that used for measuring the wear resistance.

However, this method is amplified by the bearing pressure being successively increased to such a degree that the applied coating or layer is pushed away with only one rubbing movement. Measurement conditions: as in Table 1, but with differing bearing pressure.

TABLE 3

| | 3.5 Results | |
|---|---|---|
| Bearing | Number of the rubbing movements until the substance on the support is destroyed | |
| pressure p/cm² | Substance according to the invention | Vermiculite |
| 130 | 100 | 16 |
| 150 | 100 | 4 |
| 200 | 100 | 1 |
| 500 | 100 | 1 |
| 1000 | 100 | 1 |

After 100 rubbing movements, no deterioration in the adhesion of the substance according to the invention to the support is found. This result is the same on bright steel as it is on glass.

With another series of measurements, using successively increased bearing pressure, no deterioration in the adhesion to the said supports was found with the substance according to the invention, even with a bearing pressure of 1000 p/cm² and 100 rubbing movements.

On the other hand, the starting substance for the manufacture of the substance according to the invention, namely, vermiculite, having practically the same composition of the grain sizes, already after 16 rubbing movements on steel with a bearing pressure of 130 p/cm² in each case and after 19 rubbing movements on glass, these being used as supports, is found to be rubbed off the latter, i.e. it has no sufficient adhesion.

Vermiculite, as basic substance, already with the 4th rubbing movement with a bearing pressure of 150 p/cm², and with the first rubbing movement at 200 p/cm², is completely rubbed off the support.

The difference in the adhesion strength is considerable. The new substance according to the invention shows a tight or firm adhesion with the selected support. This is likewise applicable when the bearing pressure is increased by one power of ten.

On the contrary, the starting material for the production of the new substance in accordance with the invention does not have any adhesion strength with the same support, already after a few rubbing movements with a low bearing pressure.

It is surprising that the new substance according to the invention, as regards this parameter, shows entirely different properties from those of the starting material, which is vermiculite.

As confirmed by these comparative measurements, the new substance according to the invention is different from its starting material, vermiculite, as regards the essential parameters of the plastic properties, the rheological properties, the resistance to wear and the adhesion strength, using known methods or using any defined method.

This is applicable in like manner as regards hydromica, when used as starting material.

This discovery is based on the fact that the new substance according to the invention has physical and chemical parameters which are different from those of the starting substance or material, from which it is possible to produce this new substance in accordance with the process as disclosed or in accordance with other processes.

One technical advantage is produced, for example, in respect of the use as a binder together with other active principles which, in such a mixture, have strong adhesion power with a large specific surface of about 12 m²/g.

The mineral substance according to the invention is thus preferred as a support material for various fields of application which are known in the art. Included in such fields is the application of plant protection agents.

Another field of application consists in the use as a fire-proofing compound.

The sintering point of the mineral substance according to the invention is in the region of 1260° C. and the melting point in the region of 1350° C.

Important applications also consist in the use of bodies and films of this incombustible mineral substance according to the invention. The said substance may with advantage also be used in expanded form. It is surprising that the mineral substance of the invention, for which a wide range of use exists in practice, has not so far been proposed.

This possibility has been produced for the first time, after the first proposal and disclosure of the mineral substance according to the invention.

Another form of use consists in the employment of the mineral substance according to the invention as a parting compound.

| DIAGRAM 1 | | |
|---|---|---|
| Plasticity measurements according to Pfefferkorn and Bowmaker (20° C.) | | |
| Bowmaker scale | | Pfefferkorn scale |
| | | Plasticity factor according to Pfefferkorn |
| | | 1. Substance acc. to invention |
| h₁(mm) ↑ | h₀/h1 ↑ | |
| | | 2. ground vermiculite |

-continued

3. Lean clay

4. Fat clay

Water content (g. of H₂O/100 g. of dry substance)

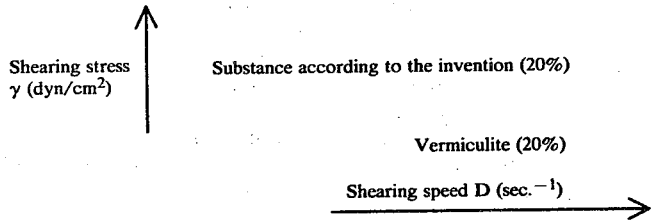

DIAGRAM 2
Rheological properties of the substance according to the invention in aqueous dispersion at 20° C.

Concentration: 20 per cent by weight
Control substance: ground vermiculite

Method of measurement:
Rotary viscosimeter - "Rheomat-15"/Contrave

Shearing stress $\gamma$ (dyn/cm²)

Substance according to the invention (20%)

Vermiculite (20%)

Shearing speed D (sec.⁻¹)

What is claimed is:

1. A reversibly swellable tri-laminar mineral which is crystalline over a large area and in which the crystal layers are separated from one another, said tri-laminar mineral containing more than about 50 percent by weight of tabular particles, said particles having a thickness of from about 0.5 to about 10 microns, an equivalent diameter of from about 10 to about 200 microns, a ratio of particle thickness to equivalent diameter equal to or smaller than about 1:10, said particles possessing hydrophilic properties on the planar surfaces thereof permitting the particles to quickly take up or give off water, and upon taking up water, the particles swell, and upon giving off water, the particles shrink, in a single direction which is perpendicular to the tabular plane of the particles, it being further provided that said particles are disposed substantially side by side in flat layers and with extensive plasticity in the range of from about 35 to about 65 percent, said tri-laminar material having a plasticity factor $h_1$ of from about $65.4393 - 1.32126 \cdot W + 1.03456 \cdot 10^{-2}W^2 - 2.80579 \cdot 10^{-5}W^3$ in the limits of from about 60 to about 140 W with $h_1$ representing mm. on the Bowmaker scale and W representing g H₂O/100 g of dry substance.

2. The reversibly swellable tri-laminar mineral of claim 1 having a shearing stress $\tau$ (dyn/cm²) equalling at least about $277.861 + 16.7424D - 1.39397 \cdot 10^{-1}D^2 + 4.15845 \, D^3$, as an expression of the rheological properties thereof in aqueous dispersion at a concentration of about 20% by weight and at 20° C., measured by a rotation viscosimeter, in the limits from zero to 140 D with D representing the shearing speed in sec⁻¹.

3. The reversibly swellable tri-laminar mineral of claim 1 which, following drying on the surfaces thereof from a dispersion in a polar liquid, does not show any shrinkage cracks.

4. The reversibly swellable tri-laminar mineral of claim 1 forming a mass with dense particle packing and a small pore volume upon drying of the surfaces thereof.

5. The reversibly swellable tri-laminar mineral of claim 1 containing more than about 75% by weight of said tubular particles.

6. The reversibly swellable tri-laminar mineral of claim 1 wherein said tubular particles have a thickness of from about 0.5 to about 5 microns.

7. The reversibly swellable tri-laminar mineral of claim 1 wherein the ratio of particle thickness of equivalent diameter of said tubular particles is equal to or smaller than about 1:20.

8. The reversibly swellable tri-laminar mineral of claim 1 in a binder composition.

9. The reversibly swellable tri-laminar mineral of claim 1 in the expanded state.

10. The reversibly swellable tri-laminar mineral of claim 1 which, in the dry state, shows a shrinkage of the tabular particles with respect to the length and breath thereof of from about 0.5 to about 1.5%, and with respect to the thickness thereof, of from about 25% to about 35%.

11. The reversibly swellable tri-laminar mineral of claim 1 in a parting composition.

12. A process for preparing the mineral substance of claim 1 which comprises contacting a fine-grain crystalline mineral selected from the group consisting of vermiculite and hydro-mica, said mineral containing a non-water swellable mineral in intracrystalline form, with water to swell the mineral, and comminuting the swollen mineral under conditions preserving its crystalline structure to provide a mineral having substantially thin, uniformly planar, tubular particles, the plasticity $h_1$ of said mineral being about $65.4393 - 1.32126 \cdot W + 1.03456 \cdot 10^{-2}W^2 - 2.80579 \cdot 10^{-5}W^3$ in the limits of about 60 to about 140 W with $h_1$ representing mm. on the Bowmaker scale and W representing g H₂O/100 g of dry substance.

13. The process of claim 12 wherein the polar liquid is water.

14. The process of claim 12 wherein the swollen mineral is comminuted to provide a mineral having a shearing stress $\tau$ (dyn/cm²) of at least about $277.861 + 16.74224D - 1.39397 \cdot 10^{-1}D^2 + 4.15845 \, D^3$ as an expression of the rheological properties thereof in aqueous dispersion at a concentration of about 20% by weight at 20° C. measured by a rotation viscosimeter in the limits from 0 to 140 D with D representing the shearing speed in sec⁻¹.

* * * * *